(12) United States Patent
Julian et al.

(10) Patent No.: US 6,901,716 B1
(45) Date of Patent: Jun. 7, 2005

(54) GROUND STAKE FOR HOLDING DRAIN PIPE

(75) Inventors: Frank D. Julian, Kansas City, MO (US); Gene B. Young, Kirkwood, MO (US)

(73) Assignee: Sioux Chief Manufacturing Co, Inc., Peculiar, MO (US)

( * ) Notice: Subject to any disclaimer, the term of this patent is extended or adjusted under 35 U.S.C. 154(b) by 0 days.

(21) Appl. No.: 10/631,490

(22) Filed: Jul. 31, 2003

(51) Int. Cl.[7] .............................................. E04B 1/38
(52) U.S. Cl. ........................ 52/712; 52/157; 411/485; 411/483; 248/49; 248/55; 248/62; 248/65; 248/70; 405/157; 405/158
(58) Field of Search .................. 52/157, 712; 411/485, 411/483; 248/49, 55, 62, 65, 70; 405/154, 405/158

(56) References Cited

U.S. PATENT DOCUMENTS

| | | | | |
|---|---|---|---|---|
| 3,279,300 A | * | 10/1966 | Larson | 411/485 |
| 3,568,455 A | * | 3/1971 | McLaughlin et al. | 405/184.4 |
| 4,492,493 A | * | 1/1985 | Webb | 405/172 |
| 4,826,111 A | | 5/1989 | Ismert | |
| 4,831,798 A | * | 5/1989 | Otteson | 52/153 |
| 4,836,111 A | * | 6/1989 | Kaufmann | 104/89 |

OTHER PUBLICATIONS

Sioux Chief Manufacturing Company, Inc. Catalog 2001, p. 17, Tomahawk DWV Ground Stakes.
Webpage www.westernwireprod.com/pecontent/jhooks.html, on sale more than one year prior to filing.

* cited by examiner

Primary Examiner—Carl D. Friedman
Assistant Examiner—Steve Varner
(74) Attorney, Agent, or Firm—Erickson & Kleypas L.L.C.

(57) ABSTRACT

A one piece ground stake for securing drain, waste or vent pipe relative to the ground comprises a wire rod bent to form a hook having a ground engaging shank, a pipe engaging bend or cradle and a connecting leg connected between the pipe engaging bend and the shank by upper and lower connecting bends. The upper connecting bend extends above the lower connecting bend and is adapted to be struck by a hammer or the like to drive a lower end of the shank into the ground. The stake is driven into the ground until the cradle abuts against an upper surface of a pipe positioned on a bed of gravel, sand or the ground at a selected grade and position.

14 Claims, 3 Drawing Sheets

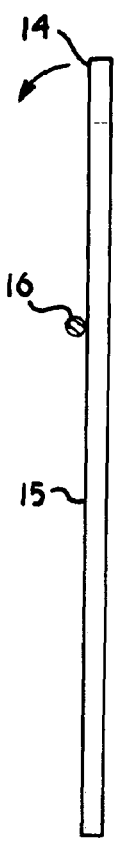
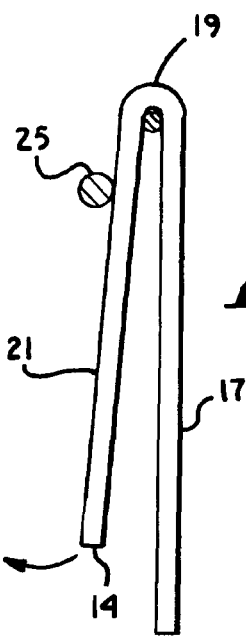
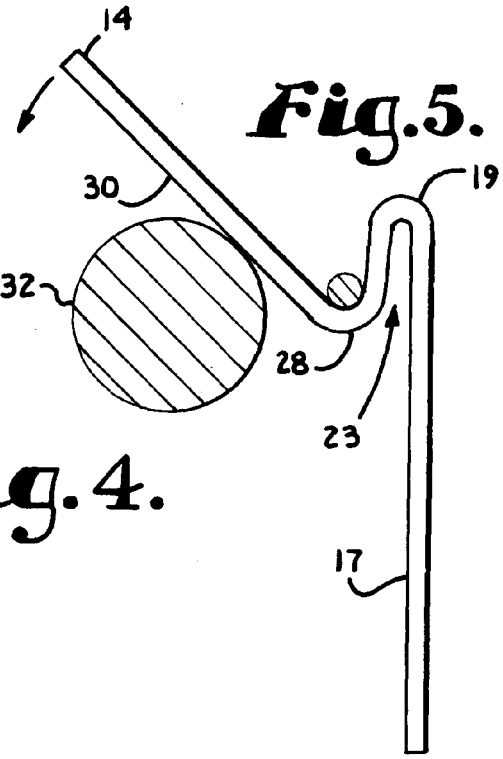
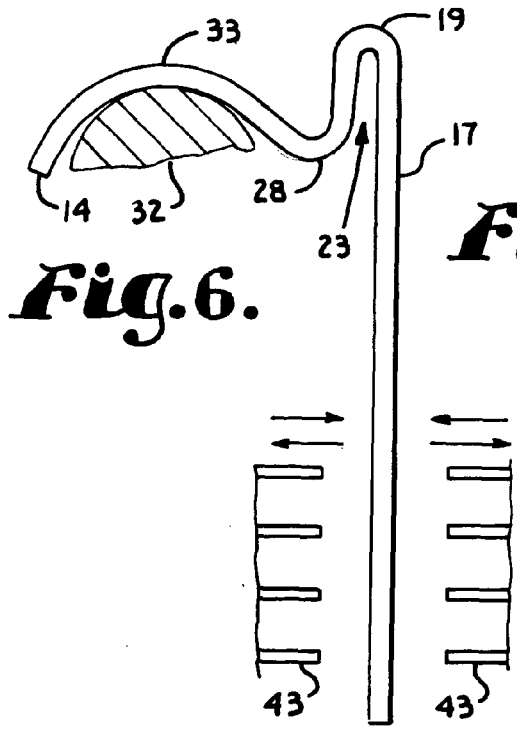
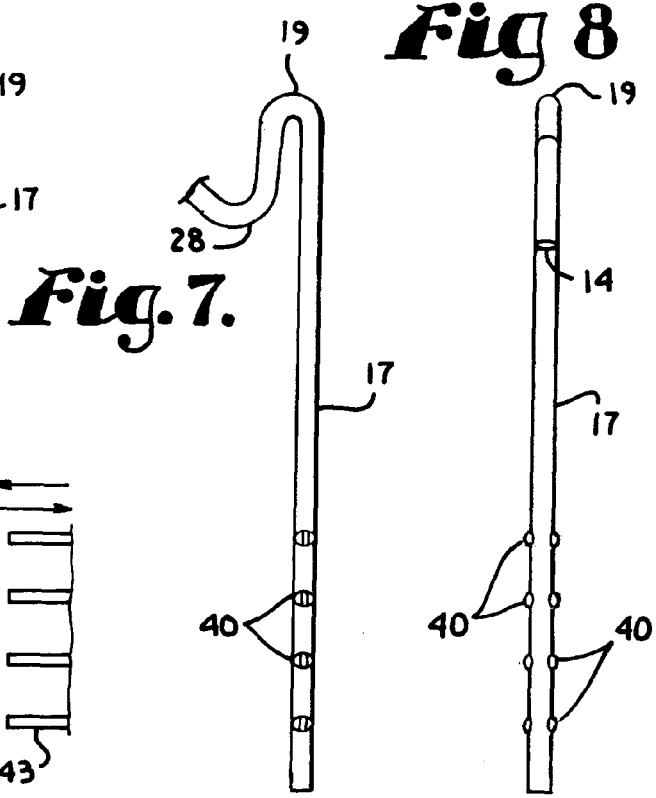

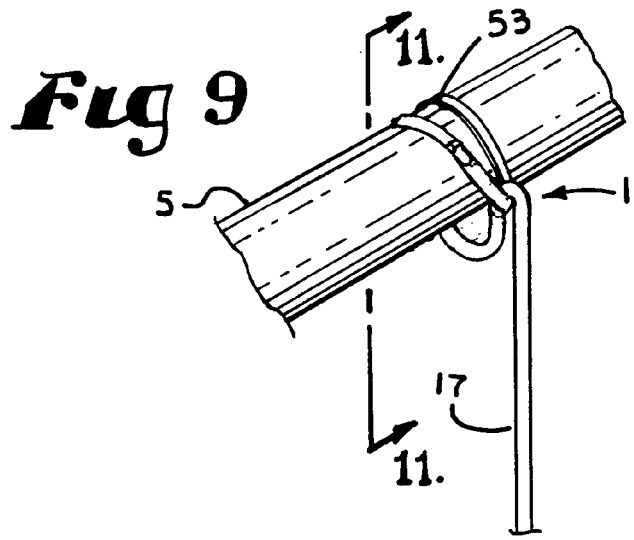
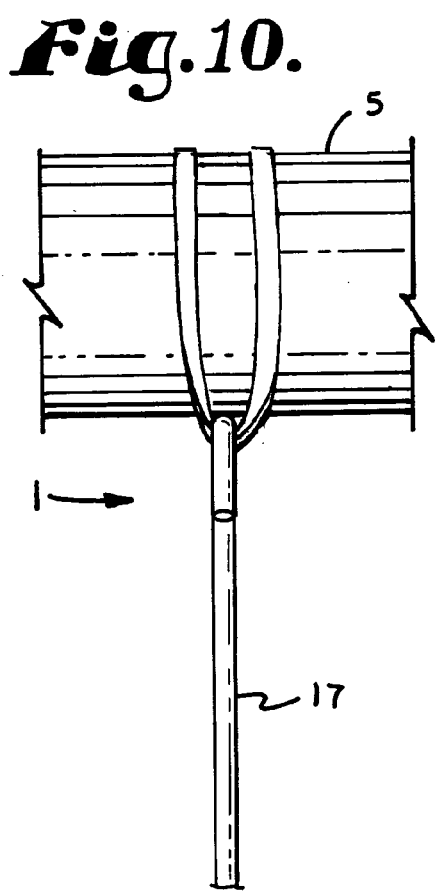
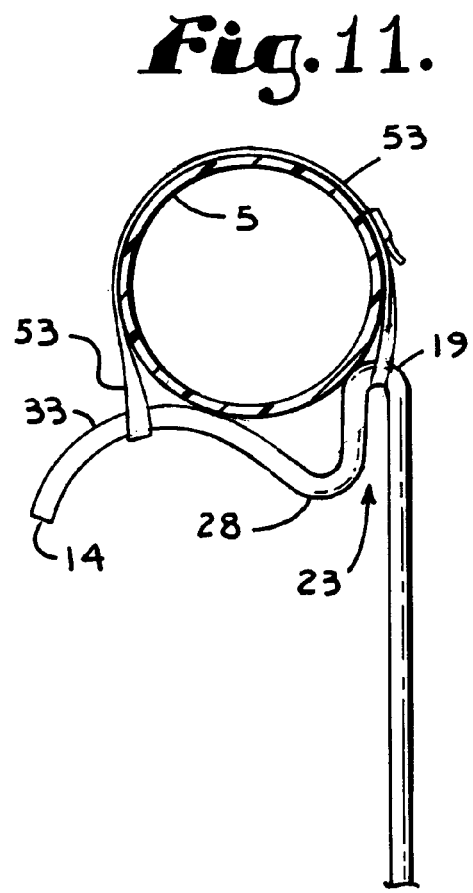

GROUND STAKE FOR HOLDING DRAIN PIPE

BACKGROUND OF THE INVENTION

The present invention relates to ground stakes for use in securing drain pipe and the like to the ground.

When laying drain or waste pipe in construction projects it is important that the pipe is maintained at a proper grade or slope to permit proper draining. Once the pipe is laid in position, typically on a gravel bed, ground stakes are then used to secure the pipe in position and to prevent the pipe from floating upward or moving from side to side as additional gravel and concrete are poured around and over the pipe. If the pipe is allowed to float the desired grade may not be maintained and if the pipe is allowed to move from side to side, the relative position of inlets and outlets or stub ups may change.

Examples of existing ground stakes are the TOMAHAWK™ DWV Ground Stakes sold by Sioux Chief Manufacturing Company, Inc., as seen on page 17 of its 2001 Catalog. The TOMAHAWK™ ground stakes are of two piece construction comprising a hook shaped head which is attached to a straight length of rebar or the like. One version of the TOMAHAWK™ ground stake utilizes a metal head which is welded to the metal rebar and an alternative embodiment utilizes a molded plastic head having a hole for receiving one end of a rebar stake. The plastic head is held on the rebar by frictional engagement.

Although the existing TOMAHAWK™ ground stakes work well for their intended purpose, the two piece construction adds to the expense in manufacturing and assembling the items. There remains a need for a ground stake that is relatively inexpensive to manufacture and easy to use in securing drain, waste or vent pipes in position during the construction process.

SUMMARY OF THE INVENTION

The present invention comprises a ground stake for use in securing a pipe, such as drain, waste or vent pipe, in position relative to the ground to prevent the pipe from moving as gravel, concrete or other materials are poured over and around the pipe during construction. Although the invention is described herein primarily with reference to drain pipe, it is to be understood that the ground stake is also adapted for use with waste and vent pipes.

The ground stake comprises a hook having a shank, a pipe engaging bend or cradle and a connecting leg connected between the pipe engaging bend and the shank by upper and lower connecting bends. The upper connecting bend extends above the lower connecting bend and is adapted to be struck by a hammer or the like to drive the lower end of the shank into the ground. The stake is driven into the ground until the cradle abuts against an upper surface of a pipe laying on a bed of gravel, sand or the ground.

Alternatively, the ground stake can be used to support a pipe above the ground. The shank is driven into the ground until the top of the hook is positioned at the desired height to support a pipe. The pipe is then positioned to rest on top of the ground stake, cradled between the pipe engaging bend and the upper connecting bend, connecting the connecting leg to the shank. The pipe is secured to the ground stake using string, a band, a cable tie or the like threaded around the connecting bend, around the upper curved surface of the pipe and then around the pipe engaging bend of the hook.

The hook is preferably formed from a metal rod with the upper connecting bend bent so that the connecting leg extends approximately parallel to the shank or towards parallel alignment with the shank and a gap is formed between the connecting leg and the shank. The gap between the connecting leg and the shank measured just below the connecting bend is preferably no wider than one and a half times as wide as the thickness of the shank. The gap is typically slightly narrower near the upper connecting bend than it is near the second connecting bend. The desired gap is obtained in forming the connecting bend by bending the rod around a bending tool having a radius that is approximately the same and preferably no more than one and a half times the radius of the rod. The resulting radius of the connecting bend is therefore, approximately the same dimension as and preferably no more than one and one half times the radius of the rod itself.

Gripping projections are formed on the shank near a lower end thereof. The gripping projections extend outward from the outer surface of the shank and are adapted to help hold the stake in the ground and provide some resistance to movement of the stake upward out of the ground.

The objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIGS. 3–7 are diagrammatic views showing the steps for bending a metal rod to form the ground stake and for forming ground gripping projections on a shank of the ground stake.

FIG. 8 is a side view of the ground stake as shown in FIG. 4 showing outwardly extending projections formed thereon.

FIG. 9 is a fragmentary perspective view showing a pipe supported on a ground stake of the present invention.

FIG. 10 is a fragmentary and enlarged left side view of the pipe supported on the ground stake as shown in FIG. 9.

FIG. 11 is a fragmentary and enlarged front elevational view of the pipe supported on the ground stake as shown in FIG. 9.

DETAILED DESCRIPTION OF THE INVENTION

Figures 1, 2:
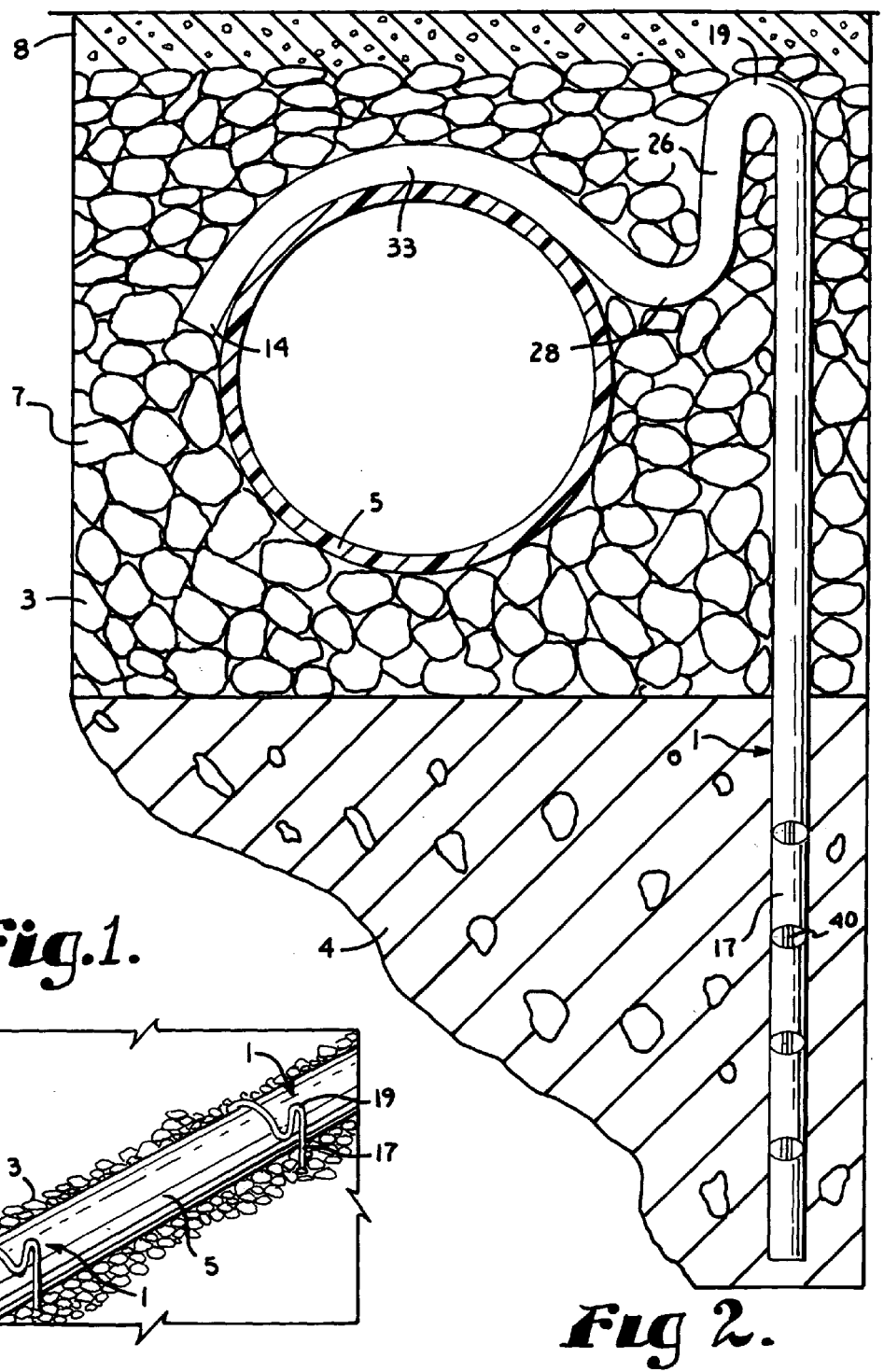
FIG. 1 is a fragmentary perspective view showing a pair of ground stakes driven through a gravel bed and into the ground (not shown) and securing a drain pipe in position on the gravel bed.
FIG. 2 is an enlarged and fragmentary cross-sectional view showing one of the ground stakes driven into the ground and securing the drain pipe in position on the bed of gravel in a manner similar to that shown in FIG. 3, with an additional layer of gravel and then a layer of concrete poured over the drain pipe.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 refers to a ground stake 1 of the present invention. In FIG. 1, a pair of ground stakes 1 are shown driven through a layer of gravel or a gravel bed 3 and into the ground 4 (see FIG. 2) to secure a drain pipe 5 in position on the gravel bed 3 and relative to the ground 4. FIG. 2 shows one of the ground stakes 1 holding the drain pipe 5 in position relative to the ground 4 after an additional layer of gravel 7 and then a layer of concrete 8 have been poured over the drain pipe 5, as is typical in the process of constructing foundations, parking lots and the like in which drain lines are run under a concrete slab.

The ground stakes 1 are preferably formed form round wire. Steel wire having a diameter of 0.375 inches is particularly well adapted for use in forming the ground stakes 1 of the present invention. The wire is bent to the desired shape using conventional wire bending techniques and processes. The basic steps of the wire bending process are shown diagrammatically in FIGS. 3–7.

Beginning with a predetermined length of wire rod 15, see FIG. 3, distal end 14 of wire rod 15, which was previously cut to the desired length, is bent back toward itself approximately one hundred and eighty degrees around a first wire bending tool or rod 16, as shown diagrammatically in FIG. 4, to form a shank 17 an upper connecting bend 19 and a first transitional leg 21. The first transitional leg 21 preferably extends in approximately parallel and spaced relation to the shank 17 such that a gap 23 is formed between the shank 17 and the first transitional leg 21. The upper connecting bend 19 is shown as being rounded. However, it is to be understood that the upper connecting bend 19 as well as the other bends described herein could be of other configurations including relatively square or forming a relatively sharp angle.

In forming the upper connecting bend 19 in the manner described in association with FIG. 3, the radius of the first bending tool 16 is selected to be approximately equal to and preferably no more than approximately one and one half times greater than the radius of the wire rod 15 used to form the ground stake 1. The radius of the resulting connecting bend 19 is approximately the same as the radius of the first bending tool 16 and as with the bending tool 16 is preferably approximately the same as or no more than one and a half times the radius of the rod 15.

Referring again to the drawings and namely FIG. 6, the distal end 14 of the wire rod 15 is then bent upward approximately forty five degrees from horizontal, around a second wire bending tool or rod 25 as shown in FIG. 6, to form a connecting leg 26, a lower connecting bend 28 and a second transitional leg 30. The connecting leg 26 remains extending in approximately parallel, spaced relation to the shank with the gap 23 extending therebetween. The gap 23, measured just below the upper connecting bend 19 is preferably approximately as wide as and no more than one and a half times as wide as the diameter of the wire rod 15 used to form the ground stake 1. Although the connecting leg 26 preferably extends in parallel relation to the shank 17 forming the ground stake 1 such that the connecting leg 26 extends at a slight acute angle relative to the shank, preferably no more than approximately fifteen degrees is acceptable.

As generally shown in FIG. 7, the second transitional leg is then bent or curved downwardly around a third wire bending tool or rod 32 to form a pipe engaging bend 33 which may also be referred to as a pipe receiving bend or cradle 33. The curvature or radius of the bend of the pipe receiving cradle 33 is selected to generally conform to or be slightly greater than the radius of the largest drain pipe with which the ground stake 1 is to be used. For example, in many applications, the diameter of the largest drain pipe 5 with which a ground stake 1 of the present invention is likely to be used is six and one half inches. Therefore, the curvature or radius of the pipe receiving cradle 33 for use with a six inch drain pipe 5 is at least approximately three and one quarter inches.

The wire rod 15 is bent so that the distal end 14 extends slightly below the lower most level of the lower connecting bend 26 to help keep a drain pipe 5 from moving sideways out from under the pipe receiving cradle 33. In addition, the upper connecting bend 19 and upper portions of the connecting leg 26 and the shank 17 extend above the apex or uppermost point 37 of the pipe engaging bend 33.

In an embodiment adapted for securing a six inch drain pipe 5 in position and formed from ⅜ inch diameter wire, the upper connecting bend 19 preferably extends above the apex 37 of the pipe engaging bend 33 by approximately one half an inch to one inch. The gap 23 of such a stake 1 taken along any line between the upper and lower connecting bends 19 and 28, is preferably approximately the same width as the rod, three eighths of an inch, and preferably no wider one and one half times the width of the wire rod 15, or 9/16ths of an inch for wire having a diameter of three eighths of an inch.

It is believed that forming the connecting leg 26 to be approximately parallel to the shank 17 makes the ground stake 1 easier to drive into the ground 4 by providing a clearly defined target to strike with a hammer, namely the upper connecting bend 19. It is also believed that the downwardly extending parallel connecting leg 26 and shank 17 more efficiently direct the force of a striking hammer downward facilitating efforts to drive the stake 1 into the ground.

Referring to FIG. 3, outwardly extending, semi-circular projections or ground gripping projections 40 are formed on a lower portion of the shank 17 of each ground stake 1. The projections 40 are formed by pinching or stamping opposed edges of the wire rod 15 between aligned sets of opposed pins 43 as shown diagrammatically in FIG. 7. It is foreseen that a wide variety of means or techniques could be utilized to texture the outer surface of the shank 17 to increase the frictional engagement between the ground 4 and the shank 17.

A typical use of the ground stakes 1 is to secure a drain pipe 5 in position on a gravel bed 3 as generally shown in FIGS. 1 and 2. After a drain pipe 5 has been positioned on a gravel bed 4 above the ground 3 at the desired grade and location, the position of the drain pipe 5 is fixed by driving ground stakes 1 through the gravel bed 3 and into the ground 4 adjacent the drain pipe 5 until the pipe receiving cradle 33 is advanced into partially encircling engagement with an upper surface of the drain pipe 5. The stakes 1 are driven into the ground 4 preferably by striking or otherwise applying a downwardly directed force on the upper connecting bend 19 of the stake 1. The upper connecting bend 19 may also be referred to as the strike zone or area, the striking surface or the head of the stake 1.

After the ground stakes 1 are driven through the gravel bed 3 and into the ground 4 securing the drain pipe 5 in position, the additional layer of gravel 7 and then a layer of concrete 8 are typically poured over the drain pipe 5. Although the additional layer of gravel 7 is shown extending approximately even with or slightly above the upper connecting bend 19, it is to be understood that variations of the thickness and relative depth of the layers will vary.

The ground stakes 1 hold the drain pipe 5 in place while the additional layer of gravel or any other material are poured over the drain pipe 5 and prevent the drain pipe 5 from "floating" or being pushed upward by gravel or other granular type material generally flowing under the sides of the drain pipe 5. The ground stakes 1 also prevent the drain pipe 5 from moving sideways which can cause problems due to changes in the location of inlets and outlets to the drain line.

As shown in FIGS. 9–11, The ground stakes 1 of the present invention may also be used to support drain pipe 5 or the like on top of the ground stake 1. Mounting the drain pipe 5 on top of the ground stakes 1 can facilitate the installation process by eliminating the need to lay or spread the gravel bed 3 at the desired grade. Instead the ground stakes 1 can be driven into the ground 4 until the top of the ground stake 1 is positioned at a selected height to support the ground stake 1 at the desired grade. The drain pipe 5 is then laid on top of the ground stake 1 so that the pipe 5 is supported between the upper curved surface of the pipe receiving cradle 33 and the upper or outer surface of the upper connecting bend 19. The pipe 5 can be secured in place using string, wire, a cable tie 53 or the like. As shown in FIGS. 9–11, a cable tie 53 can be threaded through the gap 23 between the connecting leg 26 and shank 17, and then both ends wrapped over and around the upper, outer surface of the pipe 5, and then around the pipe receiving cradle 33 and secured together to secure the pipe to the ground stake 1. It is foreseen that a wide variety of other ways for securing a pipe 5 to the ground stake 1 can be utilized. Once the pipe is secured in place at the desired slope or grade, gravel can then be poured around and beneath the pipe 5 to form the desired gravel bed to further support the pipe 5, and then over the pipe 5 to the desired depth.

It is to be understood that while certain forms of the present invention have been illustrated and described herein, it is not to be limited to the specific forms or arrangement of parts described and shown.

What is claimed and desired to be secured by Letters Patent is as follows:

1. A ground stake for use in securing a pipe in position relative to the ground comprising a hook formed from a metal rod and including:
    a) a shank adapted to be driven into the ground;
    b) a pipe engaging bend opening downward;
    c) a connecting leg connected at an upper end to an upper end of said shank by an upper connecting bend and connected at a lower end to an inner end of said pipe engaging bend by a lower connecting bend; said connecting leg extending at an angle of no more than approximately fifteen degrees relative to said shank and said upper connecting bend adapted to be stricken by a hammer to drive a lower end of said shank into the ground; and
    d) wherein said upper connecting bend extends above an apex of said pipe engaging bend.

2. The ground stake as in claim 1 wherein a gap is formed between said connecting leg and said shank.

3. The ground stake as in claim 2 wherein and said gap measured just below said upper connecting bend is no more than one and a half times wider than the thickness of said metal rod.

4. The ground stake as in claim 1 wherein ground gripping projections are formed on said shank.

5. A method of forming a metal rod, having a rod radius, into a ground stake for use in securing a pipe in position relative to the ground, comprising the steps of:
    a) bending an upper portion of the metal rod downward approximately one hundred and sixty five to one hundred and eighty degrees to form an upper connecting bend connecting a shank and a first transitional leg wherein said upper connecting bend has a bend radius between approximately said rod radius to one and one half times said rod radius;
    b) bending the first transitional leg upward to form a lower connecting bend connecting a connecting leg to a second transitional leg; the connecting leg extending between the upper and lower connecting bends and between approximately fifteen degrees and parallel relative to the shank;
    c) bending the second transitional leg downward to form a downwardly opening pipe engaging bend sized to conform to the outer diameter of a pipe of a selected maximum size.

6. The method as in claim 5 wherein said step of bending the upper portion of the metal rod downward to form the upper connecting bend further comprises forming the upper connecting bend such that a gap is formed between the connecting leg and the shank along an entire length of said connecting leg and the gap measured just below the upper connecting bend is at least approximately as wide as the thickness of said metal rod and no more than one and a half times wider than the thickness of the metal rod.

7. The method as in claim 5 further comprising the step of forming projections on the shank which extend outward from an outer surface of the shank.

8. A ground stake formed from a rod having a rod radius and for use in securing a pipe in position relative to the ground comprising a hook and including:
    a) a shank having a lower end adapted to be driven into the ground;
    b) a pipe engaging cradle opening downward;
    c) a connecting leg connected at an upper end to an upper end of said shank by an upper connecting bend and connected at a lower end to an inner end of said pipe engaging bend by a lower connecting bend; said upper connecting bend having a bend radius between approximately said rod radius to one and one half times said rod radius; said connecting leg extending approximately parallel to said shank from said upper connecting bend to said lower connecting bend with a gap formed between said connecting leg and said shank along the entire length of said connecting leg; and said upper connecting bend adapted to be stricken by a hammer to drive said shank into the ground.

9. The ground stake as in claim 8 wherein and said gap, measured just below said upper connecting bend, has a width of between approximately a width of said rod to one and one half times the width of said rod.

10. The ground stake as in claim 8 wherein ground gripping projections are formed on said shank.

11. A ground stake for use in securing a pipe in position relative to the ground comprising a hook formed from a metal rod having a rod radius and including:
    a) a shank having a lower end adapted to be driven into the ground;
    b) a pipe engaging cradle opening downward;
    c) a connecting leg connected at an upper end to an upper end of said shank by an upper connecting bend and connected at a lower end to an inner end of said pipe engaging bend by a lower connecting bend; said upper connecting bend having a bend radius between approximately said rod radius to one and one half times said rod radius such that a gap is formed between said connecting leg and said shank along an entire length of said connecting leg; and d) wherein said upper connecting bend extends above an apex of said pipe engaging bend.

12. The ground stake as in claim 11 wherein said connecting leg extends at an angle of no more than fifteen degrees relative to said shank.

13. The ground stake as in claim 11 wherein said connecting leg extends approximately parallel to said shank.

14. The ground stake as in claim 13 wherein said gap, measured just below said upper connecting bend, has a width of between approximately a width of said rod to one and one half times the width of said rod.

* * * * *